H. S. & L. ISAACS.

MOVING PICTURE APPARATUS.

APPLICATION FILED APR. 27, 1908.

12,869. Reissued Oct. 27, 1908.

Witnesses:
Edward F. Rowland
Wm. C. Butler

Henry S. Isaacs and Leo Isaacs
Inventors

By their Attorney H. MacKaye

UNITED STATES PATENT OFFICE.

HENRY S. ISAACS, OF BRADDOCK, AND LEO ISAACS, OF PITTSBURG, PENNSYLVANIA, ASSIGNORS TO AMERICAN MOVING PICTURE MACHINE COMPANY, A CORPORATION OF NEW YORK.

MOVING-PICTURE APPARATUS.

No. 12,869. Specification of Reissued Letters Patent. Reissued Oct. 27, 1908.

Original No. 845,551, dated February 26, 1907, Serial No. 318,134. Application for reissue filed April 27, 1908. Serial No. 429,517.

*To all whom it may concern:*

Be it known that we, HENRY S. ISAACS, of Braddock, and LEO ISAACS, of Pittsburg, in the county of Allegheny and State of Pennsylvania, citizens of the United States, have invented certain new and useful Improvements in Moving-Picture Apparatus, of which the following is a specification, reference being had therein to the accompanying drawings.

This invention relates to motion-picture machines, and more particularly to means for winding and unwinding the film strip employed in apparatus of this character.

The primary object of the present invention is to avoid the great loss of time and labor incident to this unwinding of the wound roll of film, and this we accomplish by providing mechanism whereby the coil or roll may be unwound from its inner end or innermost convolution instead of from its outer end or outer convolution. Then after the roll is coiled upon a receiving-reel the coil is slipped off of said reel and placed upon a feed-disk and again fed to the machine, uncoiling as before from its innermost convolution. Thus the usual unwinding of the coil or roll before it can be again used is obviated.

The invention also includes certain novel features of construction, which will be fully described hereinafter in connection with the accompanying drawings, which form a part of this specification, and defined in the appended claims.

Figure 1:
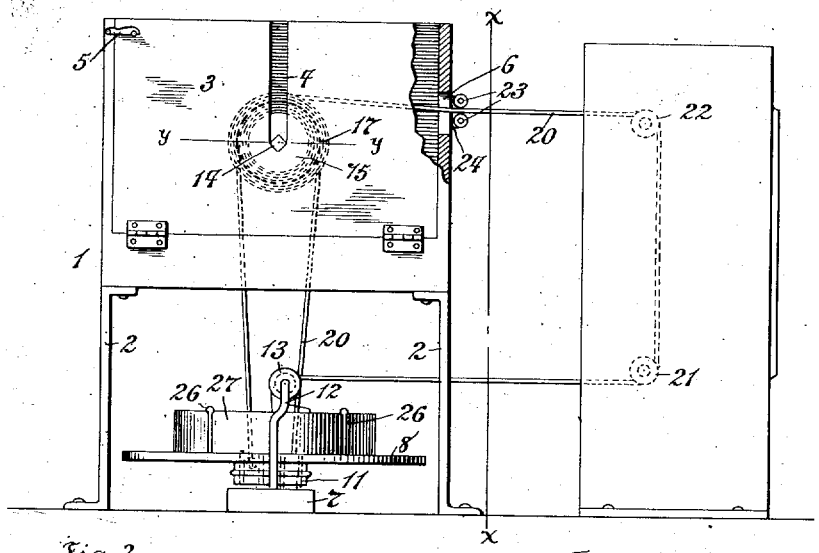
Figure 2:
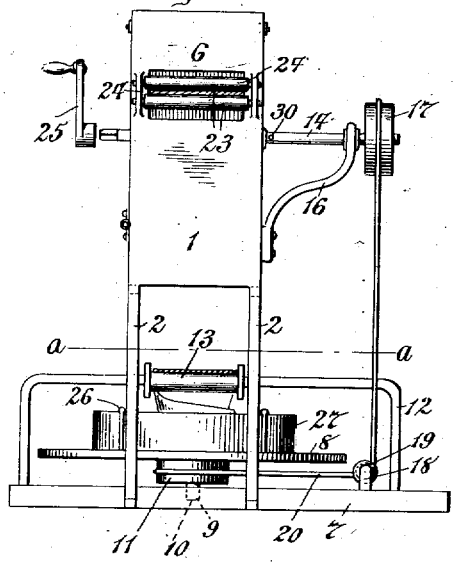
Figure 3:
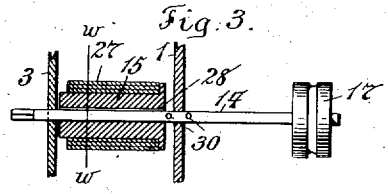
Figure 4:
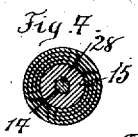
Figure 6:
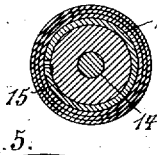
Figure 5:
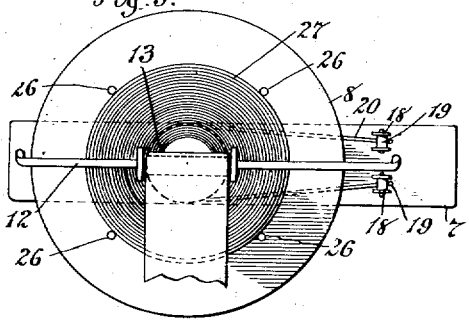

In the drawings, Figure 1 is a front elevation of an apparatus embodying the invention, the projection lantern being conventionally represented, as it forms no part of the present invention. Fig. 2 represents an end elevation of the device, the strip of film being in section, as indicated by the line *x x* of Fig. 1. Fig. 3 is a longitudinal section of the receiving-reel on the line *y y* of Fig. 1. Fig. 4 is a section on the line *w w* of Fig. 3. Fig. 5 is a top plan view of the feed-disk, and Fig. 6 is a transverse sectional view of a modification.

The invention is susceptible of embodiment in a variety of forms and constructions of apparatus, and the drawings illustrate a simple arrangement of parts capable of carrying out the invention.

The reference-numeral 1 designates a box or casing supported by legs 2 and having one of its sides hinged at its lower edge to the bottom of the box to provide a door 3, formed with a central vertical slot 4 and provided with a catch or fastening 5 of any suitable construction. One end wall of the box or casing is formed with a horizontal slot 6.

Below the casing 1 is arranged a block 7, serving as a support for a feed-disk 8, the latter having a centrally depending stud 9 fitting a bearing 10, formed in the block. Below the disk 8 and concentric therewith is a belt-pulley 11, fixed to the disk to revolve the same. Rising from the base-block 7 is a bail 12, spanning the disk 8 and serving as a guide for the film-strip, a roller 13 being mounted upon said bail, over which the strip passes, as will be more fully explained hereinafter.

The numeral 14 designates a shaft supported in bearings in the sides of the casing, the lower end of the slot 4 serving as one of said bearings. Upon this shaft within the casing is mounted a reel 15, upon which the film strip is wound, and said shaft is extended beyond one side of the casing, where it is supported by a bracket-bearing 16. Upon the extended end of the shaft 14 is mounted a belt-pulley 17, said pulley corresponding in diameter to that of the pulley 11 below the disk.

Mounted in bracket-bearings 18, projecting from the block 7, are two guide-pulleys 19, under which the driving-belt 20 passes. This belt passes around the pulleys 11 and 17, and the revolution of the shaft 14 thus revolves the disk 8 as well as the reel 15 and at the same rate of speed. Adjacent to the casing 1 is a suitable projection lantern, through which the film strip extends, passing over guide-pulleys 21 and 22. This strip also passes between a pair of guide-rollers 23, supported in horizontal position outside of the end slot 6 of the casing by bracket-bearings 24.

The end of the shaft 14 opposite to that which carries the pulley 17 is squared to receive a removable crank handle 25.

Projecting from the upper face of the disk 8 are a number of pins 26, adapted to support the coil or roll of film 27 in position on the disk.

The operation of the mechanism constructed and arranged as thus described is as follows: The roll or coil 27 is placed upon the disk 8 and supported thereon by the pins 26. The inner end of the strip is then passed over the guide-roller 13, under the pulley 21, over the pulley 22, and between the guide-rollers 23 to the reel 15, around which it is wound. Thus the film strip is brought into proper position within the projection lantern, and as the shaft 14 is revolved by the crank 25 the strip is gradually uncoiled from the center, as illustrated in Figs. 1, 2, and 5, and wound upon the reel 15. After the strip has been all wound upon the reel the crank 25 is removed from the shaft 14 and the door 3 of the casing is opened to permit of the coiled strip being slipped off of the reel and returned to its position upon the feed-disk 8. To accomplish this removal of the coil or roll of the film from the receiving-reel 15, we preferably secure the reel upon the shaft 14 by means of a removable key 28, and by removing said key the reel may be readily slipped from the shaft and then withdrawn from the center of the coil and replaced upon the shaft.

In Fig. 6 we have shown a modified construction of receiving-reel, which is similar to that shown in Fig. 4, except that an additional element is employed, consisting of a longitudinally-split sleeve 29, fitting upon the reel. The film strip is wound upon this sleeve, and when the wound coil is to be removed the sleeve (which is preferably of thin springy sheet metal) is first drawn off of the reel and is then slightly compressed to permit it to be readily drawn out of the center of the coil. This compressible sleeve or other like means may be employed to facilitate the removal of the coil without removing the shaft 14, which latter is retained in position by pins 30, extending through the shaft on opposite sides of the adjacent side wall of the casing, or other suitable retaining devices. When the sleeve 29 is on the reel, motion is transmitted to it and to the attached film by friction.

It is obvious that our improvement entirely avoids the usual rewinding of the strip, thus effecting a material saving of time and rendering the operation of the motion-picture machines practically continuous with the use of a single strip of film.

It will be understood that the invention is not restricted to either the construction or precise relative arrangement of parts shown in the drawings, but includes all such modifications and variations in the details as may be resorted to without departing from the spirit of the invention as defined in the claims.

What we claim and desire to secure by Letters Patent, is—

1. Film-feeding mechanism for motion-picture machines, comprising a revoluble support for a coil or roll of films, and means for unwinding and receiving said coil from its center or inner convolution, comprising a receiving reel.

2. Film-feeding mechanism for motion-picture machines, comprising a revoluble support for a coil or roll of films, and means for unwinding and receiving said coil from its center or inner convolution, comprising a receiving real constructed and arranged to facilitate removal of the wound coil from the receiving-reel.

3. Film-feeding mechanism for motion-picture machines, comprising a revoluble support for a coil or roll of films, means for guiding the strip or film in its passage through a projection lantern and means for unwinding and receiving said coil from its center or inner convolution comprising a receiving-reel constructed and arranged so as to facilitate removal of the coil or roll from the receiving-reel.

4. The combination with a motion-picture machine, of film-feeding mechanism comprising a revoluble support for a coil or roll of films, means for unwinding and receiving said coil from its center or inner convolution comprising a receiving-reel, and means for revolving said revoluble support, and said reel at the same speed.

5. Film-feeding mechanism for motion-picture machines, comprising a horizontally disposed feed-disk, to support a coil or roll of film, means for unwinding and receiving said coil from its center or inner convolution comprising a receiving-reel constructed and arranged so as to facilitate removal of the coil or roll from said reel, and means for revolving said disk and reel at the same speed.

6. Film-feeding mechanism for motion-picture machines, comprising a horizontally disposed revoluble feed-disk, means for supporting a coil or roll of film thereon, guide-rollers over which the coil may be unwound from its center or inner convolution and a receiving-reel constructed and arranged so as to facilitate removal of the coil or roll therefrom.

7. Film-feeding mechanism for motion-picture machines, comprising a horizontally-disposed revoluble feed-disk, a pulley concentric with said disk, guiding means over which the coil may be unwound from its center or inner convolution, a receiving-reel mounted upon a shaft and constructed and arranged to facilitate removal of the coil from said reel, a pulley on said shaft, equal in diameter to that of the disk-pulley, and a belt and guide-pulleys for revolving said disk and reel simultaneously.

8. In a film-feeding apparatus for motion-picture machines, the combination with a revoluble feed-disk, and means thereon for supporting a coil or roll of film, of a roller for guiding the film as it unwinds from the center of the coil, a receiving reel constructed and arranged to facilitate removal of the coil or roll from the reel and its replacement upon the disk, and means for revolving said disk and reel in unison.

9. In a motion-picture apparatus, the combination with a projection lantern, of a revoluble feed-disk, means thereon for supporting a coil or roll of film, a shaft supported adjacent to said disk, a receiving reel removably secured on said shaft, means for revolving said disk and reel in unison, and a series of guide-rollers over which the coil is unwound from its center, passed through the projection lantern and then coiled upon the reel.

10. The combination with a projection lantern, of a casing, a revoluble shaft mounted therein, a reel removably mounted on said shaft, a slotted door for said casing serving as one of the bearings for said shaft, a feed-disk revolubly supported adjacent to said reel, to support a coil of film, means for revolving said reel and disk in unison, and guides over which said coil may be unwound from its center or inner convolution.

11. Means for unwinding a coil or roll of material from its center or inner convolution, comprising a revoluble support for the coil or roll, guides over which the material passes as it leaves the coil, and a receiving reel upon which the coil is rewound.

HENRY S. ISAACS.
LEO ISAACS.

Witnesses:
W. C. FISHBURN,
JAS. MCLAREN.